United States Patent Office 2,856,433
Patented Oct. 14, 1958

2,856,433
SEPARATION OF ORGANIC COMPOUNDS

Bernard Hammond Markham Thompson, Beckenham, London, England, assignor, by mesne assignments, to Hercules Powder Company, a corporation of Delaware No Drawing. Application September 1, 1954
Serial No. 453,687

Claims priority, application Great Britain
September 5, 1953

6 Claims. (Cl. 260—610)

This invention relates to a process for the preparation of hydroperoxides by the oxidation of organic compounds having oxidizable hydrocarbon groups with elementary oxygen and, more particularly, it relates to the improvement in the recovery of dihydroperoxides from the oxidate. The invention may be illustrated by reference to m-diisopropylbenzene.

When m-diisopropylbenzene is oxidized by means of molecular oxygen-containing gases to produce m-diisopropylbenzene dihydroperoxide, this compound may be separated and recovered from the oxidation reaction mixture by extraction with dilute aqueous alkali metal hydroxide solution such as sodium hydroxide followed by acidification of the alkaline extract. However, on decomposing the product thus obtained by means of an acidic catalyst, it was found that the resulting crude resorcinol contained some impurities, removal of which offered considerable difficulties.

It was found that these impurities originated in part at least from a hydroperoxide which is extracted together with the m-diisopropylbenzene dihydroperoxide, when the oxidation mixture is treated in the described manner with aqueous alkali metal hydroxide solution. It was also found that this admixed hydroperoxide is m-(2-hydroxy-2-propyl) α,α-dimethylbenzyl hydroperoxide. This hydroxy hydroperoxide is formed as a by-product during the oxidation of m-diisopropylbenzene and the production of the dihydroperoxide. When the aqueous alkaline extract of the oxidation reaction mixture is subsequently acidified, the hydroxyhydroperoxide is liberated together with the dihydroperoxide and on subjecting this mixture to catalytic decomposition, the hydroxyhydroperoxide also undergoes decomposition. The product or products resulting from the decomposition of the hydroxyhydroperoxide may then either wholly or partially combine with the resorcinol which is formed from the dihydroperoxide. The yield of free resorcinol is thereby reduced and the recovery of pure resorcinol greatly hindered.

Attempts to separate the hydroxyhydroperoxide from the dihydroperoxide by the customary means such as distillation or crystallization prior to decomposition of the product proved to be unsatisfactory. The problem encountered with respect to oxidation of m-diisopropylbenzene to the dihydroperoxide followed by decomposition of the dihydroperoxide to resorcinol also was found to exist in connection with the oxidation of similar compounds such as p-diisopropylbenzene and triisopropylbenzene.

Now in accordance with the present invention it has been found that there is a substantial improvement in the process of producing dihydroperoxides by the oxidation of a compound of a formula of the group consisting of

and

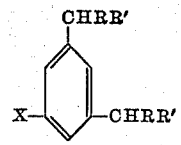

wherein R and R' represent alkyl groups having 1–2 carbon atoms and X represents a member of the group consisting of hydrogen, lower alkyl, —CHRR', halogen and —NO$_2$, in which process the dihydroperoxide is separated from the oxidate, and the unreacted compound and monohydroperoxide are recycled to the oxidation process, when the process includes the steps of extracting the dihydroperoxide from the oxidate by contacting the oxidate with an aqueous alkali solution having a concentration in the range of 1.0% to 12%, and the dihydroperoxide is recovered from the aqueous alkali solution by neutralization or acidification after the aqueous alkali solution has first been contacted with a water-insoluble volatile organic solvent having a dielectric constant greater than three.

The process of this invention is useful in the process of producing hydroperoxides from a wide variety of compounds of the above-designated formula. Examples of R and R' are methyl and ethyl. Examples of X are methyl, ethyl, propyl isopropyl, sec-butyl and 3-pentyl, halogens such as chlorine, bromine or fluorine and nitro. Specific compounds which are particularly well suited for use in oxidation processes using the process of this invention are: m-di-sec-butylbenzene, p-di-sec-butylbenzene, m-diisopropylbenzene, p-diisopropylbenzene, 1,3,5-triisopropylbenzene, 3,5-diisopropyltoluene, 3,5-diisopropylchlorobenzene and 3,5-diisopropylnitrobenzene. Dihydroperoxides which are separable from the oxidates in these processes are: m-di-sec-butylbenzene dihydroperoxide, p-di-sec-butylbenzene dihydroperoxide, m-diisopropylbenzene dihydroperoxide, p-diisopropylbenzene dihydroperoxide, 1,3,5-triisopropylbenzene dihydroperoxide, 3,5-diisopropyltoluene dihydroperoxide, 3,5-diisopropylchlorobenzene dihydroperoxide and 3,5-diisopropylnitrobenzene dihydroperoxide. In each of these instances the hydroperoxide group is attached to the tertiary carbon of the alkyl radical forming a radical of the formula —CRR'OOH.

In each of these instances there is an appreciable difference in behavior of the monohydroperoxides and the dihydroperoxides involved which makes it possible to adapt the process to their separation individually.

The oxidation process appears to be a stepwise reaction, the monohydroperoxides being formed first and the dihydroperoxide being formed subsequently from the monohydroperoxide. The recirculation of the monohydroperoxide to the oxidation step thus provides a means of increasing the conversion to dihydroperoxide without increasing the total conversion per pass. By keeping the conversion per pass in a reasonably low range there is less by-product formation. There are, in general, two by-products with which the present process has to contend. These are the keto hydroperoxide and the hydroxy hydroxyperoxide. The keto and hydroxy groups are formed by breakdown of the hydroperoxide group. Thus, one —CRR'OOH group may break down into —CRR'OH or —COR. The resulting keto hydroperoxides and hydroxy hydroperoxides are separable in the process of this invention in the caustic extraction step, and the caustic extract contains besides the dihydroperoxide also the ketohydroperoxide, the hydroxy hydroperoxide and the trihydroperoxide if present in the oxidation mixture.

The presence of these by-product hydroperoxides even in small amounts in the dihydroperoxide is undesirable as pointed out previously in connection with the products from oxidation of m-diisopropylbenzene. The present invention is based on the discovery that the hydroxy hydroperoxide and the keto hydroperoxide by-products may be separated from the dihydroperoxide to obtain a dihydroperoxide substantially free from by-product hydroperoxides by extracting the aqueous alkali solution containing all of the hydroperoxides with a water-insoluble volatile organic solvent having a dielectric constant greater than three. The by-product hydroperoxides are preferentially extracted into the organic solvent while the dihydroperoxide substantially free from the other hydroperoxides remains in the aqueous alkali solution. The dihydroperoxide then is recovered from the aqueous alkali solution by neutralization or acidification respectively, for instance, by means of carbon dioxide or by means of acids such as sulphuric acid, hydrochloric acid and nitric acid whereby the free dihydroperoxide is precipitated and may be filtered off. The hydroxy hydroperoxide and the keto hydroperoxide may be recovered from solution in the organic solvent, for instance, by distilling off the organic solvent preferably under diminished pressure.

By way of example, diisopropylbenzene is oxidized to a hydroperoxide mixture and the mixture is extracted with 5% sodium hydroxide countercurrently to remove the hydroxy hydroperoxide, the keto hydroperoxide and dihydroperoxide leaving the monohydroperoxide in the diisopropylbenzene for recycle to the oxidation. The caustic extract is then extracted with a solvent such as methyl isobutyl ketone countercurrently whereby there is separated a solvent fraction containing the hydroxy hydroperoxide and the keto hydroperoxide, and whereby a caustic solution containing the dihydroperoxide is obtained. The caustic solution of the dihydroperoxide then is acidified to precipitate the dihydroperoxide.

In the selective extraction for the separation of the dihydroperoxide and the hydroxyhydroperoxide, the selectivity increases as the alkalinity of the aqueous phase increases. By "selectivity" is meant the ratio of the distribution coefficient of hydroxyhydroperoxide between the solvent phase and aqueous phase to the distribution coefficient of the dihydroperoxide between the solvent phase and aqueous phase, the alkalinity in the aqueous phase being the same in each case. By "distribution coefficient" is meant the ratio of the concentration of the hydroperoxide in the organic solvent phase to its concentration in the aqueous phase. While the distribution coefficient of the dihydroperoxide decreases in the manner to be expected with an increase in the alkalinity of the aqueous phase, the distribution coefficient of the hydroxy hydroperoxide diminishes more slowly than is to be expected.

The following table shows the increase of selectivity in the case of m-diisopropylbenzene dihydroperoxide and m-diisopropylbenzene hydroxy hydroperoxide extracted with methyl isobutyl ketone from aqueous sodium hydroxide solutions of varying concentrations containing 3% total hydroperoxides dissolved therein.

| Sodium hydroxide concentration, percent | pH | Selectivity |
| --- | --- | --- |
| 0.98 | 13.2 | 1.6 |
| 2.73 | 13.9 | 4.4 |
| 4.84 | 14.1 | 10.3 |
| 7.44 | 14.3 | 13.3 |

In general the selectivity begins to be sufficiently great for separation of the two hydroperoxides to become feasible at an alkalinity in the aqueous phase which corresponds approximately to a content of about 1% by weight of sodium hydroxide. It is preferred, however, to operate with an alkalinity in the aqueous phase which corresponds to a sodium hydroxide concentration of 2% or more. The upper limit for the alkalinity in the aqueous phase is governed by the fact that when the concentration of alkali hydroxide in the aqueous phase is in excess of that corresponding to about 12% by weight of sodium hydroxide, the dihydroperoxide shows a tendency to be precipitated in the form of its alkali salt in admixture with some hydroxyhydroperoxide. In order to avoid this it is preferred to use an alkalinity which is less than that corresponding to about 10% by weight of sodium hydroxide, for instance, about 8%.

Salts which are inert under the prevailing conditions such as the sulfate or chloride of sodium are advantageously added to or are present in the aqueous solution, since they improve the selectivity and thus facilitate the separation of the two kinds of hydroperoxide.

The alkali used in the process is any of the alkali metal hydroxides, particularly sodium or potassium hydroxide. Sodium hydroxide is preferred. The concentration of aqueous alkali for extracting the dihydroperoxide from the oxidate in the process of this invention is about 1.0% to about 12% and the preferred concentration is 4% to 8%. The exact preferred concentration will depend upon the dihydroperoxide being produced.

The solvents which are useful in the process of this invention are volatile water-insoluble organic solvents which are solvents for the hydroperoxide and which have a dielectric constant greater than three. They should boil below about 70° C. at 20 mm. mercury pressure. They must be stable to caustic solutions of the strength used in the extraction and be water-insoluble. By "water-insoluble" is meant having a solubility of less than about 8% in water at about 30° C. The distribution of the dihydroperoxide between the aqueous alkali metal hydroxide solution and the organic solvent is considered in determining what particular solvent is selected. Satisfactory solvents include chlorinated hydrocarbons such as methylene chloride, carbon tetrachloride, trichlorethane, trichloroethylene, and ethylene chloride; ethers such as diethyl ether, diisopropyl ether, di-n-butyl ether and mixed ethers such as ethyl isopropyl ether; ketones such as methyl propyl ketone, methyl isopropyl ketone, methyl isobutyl ketone and cyclohexanone; alcohols such as butanols and pentanols. Solvents which it is preferred to use include methyl isobutyl ketone and diisopropyl ether.

The extraction temperature may be anywhere in the range of about the freezing point of the alkali solution to about 80° C. The temperature must be below the boiling point of the solvent at the pressure used in order to maintain it in the liquid state and if necessary the extraction is carried out at elevated pressure. The temperature is preferably kept below about 30° C.

In carrying out the process of this invention, it is preferred to carry out the extraction without delay since hydroperoxides gradually decompose and this decomposition is accelerated by elevated temperatures, acids and strong alkalies. While the time element is not critical, the hydroperoxides should be dealt with cautiously and caustic solutions of the hydroperoxides should be cooled to as low a temperature as possible without freezing if the extraction is delayed for any reason.

The following examples are specific illustrations of the process of this invention. All parts, percentages and ratios are by weight.

*Example 1*

100 parts m-diisopropylbenzene was oxidised by passing a fine stream of air into rapidly stirred m-diisopropylbenzene in a tall cylindrical vessel while passing 0.5% aqueous sodium carbonate in a fine stream into the top of the vessel. The temperature during the oxidation was 90° C. The contact time of the m-diisopropylbenzene in the oxidiser was such that the product contained 66.7% hydroperoxide (calculated as m-diisopropylbenzene monohydroperoxide). The oxidate on further analysis showed the presence of 54% m-diisopropylbenzene monohydroperoxide, 7% m-diisopropylbenzene dihydroperoxide, and 1% m-diisopropylbenzene hydroxyhydroperoxide.

One hundred parts of this oxidate was cooled and introduced on the fifth stage of a 7-stage liquid-liquid extractor through which 5.3 parts m-diisopropylbenzene and 65.5 parts 7.8% aqueous sodium hydroxide flowed countercurrently. The organic phase separated from the extractor contained 99% + of the diisopropylbenzene monohydroperoxide, 7% of the m-diisopropylbenzene dihydroperoxide and 10% of the m-diisopropylbene hydroxydroperoxide which was in the oxidate fed to the system. This organic phase was returned to the oxidiser for further oxidation.

One hundred parts of the aqueous phase from the extractor which contained the m-diisopropylbenzene dihydroperoxide and the m-diisopropylbenzene hydroxyhydroperoxide was fed to the fourth stage of a 13-stage liquid-liquid extractor through which 21.4 parts 7.4% aqueous sodium hydroxide and 63.5 parts methyl isobutyl ketone was passed countercurrently. The methyl isobutyl ketone extract recovered from the extractor contained 3% of the m-diisopropylbenzene dihydroperoxide and 96% of the m-diisopropylbenzene hydroxyhydroperoxide in the caustic extract fed to the extractor. This product was recovered by distilling the methyl isobutyl ketone and the methyl isobutyl ketone was returned to the extractor.

The aqueous caustic which had been impoverished in m-diisopropylbenzene hydroxyhydroperoxide by the extraction with methyl isobutyl ketone contained 97% of the m-diisopropylbenzene dihydroperoxide which existed in the caustic extract fed to the extractor. The aqueous caustic was cautiously neutralized with acid to precipitate the dihydroperoxide. Pure m-diisopropylbenzene dihydroperoxide melts at 61° C.

Example 2

Substantially similar results were obtained in the substitution of p-diisopropylbenzene in Example 1. Pure p-diisopropylbenzene dihydroperoxide melts above 150° C.

Example 3 m-Diisopropylbenzene was oxidized under conditions similar to those employed in Example 1 and the oxidate contacted with aqueous sodium hydroxide to give a solution containing m-diisopropylbenzene dihydroperoxide (DHP) and m-diisopropylbenzene hydroxyhydroperoxide (HHP). The alkaline solution of mixed hydroperoxides was then subjected to fractional extraction according to the process of the present invention.

An extraction column of the rotating-core type was used, having a stainless steel rotor mounted in glass column and operated by a constant speed electric motor through a chain of variable speed pulleys. This column had an effective length of 98.5 cm. and an annulus width of 2.05 mm. The free space in the column was 160 ml.

A solution of the two hydroperoxides to be separated in aqueous 7.4% w./w. sodium hydroxide was fed to the top of the column, and diisopropyl ether, previously saturated with water, was fed to the bottom of the column. Both liquids were fed to the column by gravity through small metal needle valves and rotameters so that flow rates could be maintained constant.

The organic phase was dispersed and after allowing for purging of the column by feeds equal to 3 to 4 times the column free space, effluent samples were collected during a measured time. The aqueous alkaline phase issuing from the column was carefully treated with carbon dioxide to precipitate the dihydroperoxide. The results are shown in the table below.

Example 4

The process of Example 3 was repeated using methyl isobutyl ketone instead of diisopropyl ether. The results are shown in the table below.

Example 5 m-Diisopropylbenzene was oxidized and the oxidate extracted with aqueous alkali as in Example 3. In the subsequent organic solvent extraction step the same extraction column was used but the method of fractional extraction was employed whereby the feed solution of the two hydroperoxides in aqueous 7.4% w./w. sodium hydroxide was introduced at the middle point of the column and additional aqueous 7.4% w./w. sodium hydroxide at the top. The extracting solvent, methyl isobutyl ketone, was fed to the bottom of the column.

The operation of the column was otherwise as previously described and the results are shown in the table below.

Example 6

The process of Example 3 was repeated using a packed extraction column of the type described by Feick and Anderson.[1] It consisted of a length of glass tubing of mean internal diameter 1.5 cm. having a feed entry about the middle point. It was packed with 6 mm. saddles to a depth of 4 feet above the middle feed entry and 3 feet 6 inches below it. Pulsations were applied at the bottom of the column through a 1 inch neoprene diaphragm actuated by a plunger with an amplitude of 1/16 inch at a frequency up to 500/minute.

The solution of the two hydroperoxides to be separated in aqueous 7.4% w./w. sodium hydroxide was fed to the middle feed entry and additional aqueous 7.4% w./w. sodium hydroxide at the top of the column. The extracting solvent methyl isobutyl ketone was fed to the bottom of the column. Having adjusted the liquid flow rates to the desired values the pulsator was started and after allowing for purging of the column by feeds equal to 3 or 4 times the column free space, effluent samples were collected during a measured time. The dihydroperoxide was recovered from the aqueous alkaline phase by careful precipitation with carbon dioxide. The results are shown in the table below.

Example 7

The process of Example 6 was repeated, except that the two hydroperoxides to be separated were dissolved in aqueous 3.85% w./w. sodium hydroxide, and the fresh alkali fed to the top of the column was of the same strength. Methyl isobutyl ketone was again the extracting solvent. The results are given in the table below.

| Example | 3 | 4 | 5 | 6 | 7 |
| --- | --- | --- | --- | --- | --- |
| Feed composition, percent w./w.: | | | | | |
| Sodium hydroxide | 7.4 | 7.4 | 7.4 | 7.4 | 3.85 |
| m-HHP | 1.69 | 1.69 | 1.1 | 1.13 | 0.85 |
| m-DHP | 12.37 | 12.37 | 11.05 | 10.22 | 7.66 |
| Flow rates, g/hour: | | | | | |
| Feed solution | 160 | 230 | 210 | 460 | 640 |
| Extracting solvent | 340 | 160 | 145 | 320 | 178 |
| Fresh stripping alkali | | | 65 | 200 | 270 |
| Aqueous phase, m-DHP: | | | | | |
| Purity, percent w./w | 100 | 100 | 99.6 | 99.2 | 98.5 |
| Recovery, percent w./w | 72 | 71 | 97 | 99 | 98.6 |
| Organic phase, m-HHP: | | | | | |
| Purity, percent w./w | 34 | 33 | 84.3 | 86 | 82 |
| Recovery, percent w./w | 100 | 100 | 97 | 87 | 85 |

What I claim and desire to protect by Letters Patent is:
1. The process for the production of a dihydroperoxide from a compound of the formula selected from the group consisting of

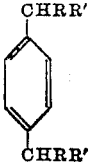

[1] Feick, G., and Anderson, H. M., Ind. Eng. Chem., 1952, 44, 404.

and

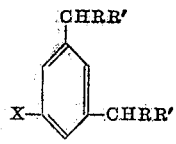

wherein R and R' represent alkyl groups having 1–2 carbon atoms and X represents a member of the group consisting of hydrogen, lower alkyl, —CHRR', halogen and —NO$_2$ which comprises contacting said compound with elementary oxygen under hydroperoxide-forming conditions to form an oxidate containing mono- and dihydroperoxides and hydroxyhydroperoxides thereof, extracting the dihydroperoxide and the hydroxyhydroperoxide thereof from the oxidate by contacting the oxidate with an aqueous alkali metal hydroxide solution having a concentration in the range of about 1.0% to about 12% and recycling the oxidate impoverished in dihydroperoxide to the oxidation process, contacting the aqueous alkali metal hydroxide solution with a water-insoluble volatile organic solvent having a dielectric constant greater than three in an amount sufficient to extract most of the hydroxyhydroperoxide but very little of the dihydroperoxide into the water-insoluble volatile organic solvent and neutralizing the aqueous alkali metal hydroxide solution containing the dihydroperoxide to precipitate the dihydroperoxide.

2. The process of claim 1 wherein the hydroxyhydroperoxide is recovered from the water-insoluble volatile organic solvent by distillation.

3. The process of claim 1 wherein the aqueous alkali metal hydroxide solution has a concentration in the range of about 4% to about 8%.

4. The process of claim 1 wherein the compound oxidized is m-diisopropylbenzene.

5. The process of claim 1 wherein the compound oxidized is p-diisopropylbenzene.

6. The process of claim 1 in which the compound oxidized is 1,3,5-triisopropylbenzene.

References Cited in the file of this patent

UNITED STATES PATENTS 2,664,447     Lorand et al.            Dec. 29, 1953

FOREIGN PATENTS 968,209     France                  Apr. 12, 1950
646,102     Great Britain         Nov. 15, 1950
485,435     Canada                Aug. 5, 1952

OTHER REFERENCES

Michaud et al.: Ann. Physique (9) 11, p. 309.
Beilstein: Handbuch der Org. Chem., vol. V (1930), p. 99.